United States Patent
Itoh et al.

(10) Patent No.: US 7,984,033 B2
(45) Date of Patent: Jul. 19, 2011

(54) DATA CONTROL SYSTEM CAPABLE OF PRESENT CURRENT IMAGE OF WRITER WITH DATA

(75) Inventors: Atsushi Itoh, Kanagawa (JP); Tadashi Araki, Kanagawa (JP); Ai Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1316 days.

(21) Appl. No.: 11/121,042

(22) Filed: May 4, 2005

(65) Prior Publication Data

US 2005/0267890 A1    Dec. 1, 2005

(30) Foreign Application Priority Data

May 17, 2004  (JP) ................. 2004-146574

(51) Int. Cl.
*G06F 17/30* (2006.01)
(52) U.S. Cl. .................. 707/706; 707/803
(58) Field of Classification Search .......... 707/706, 707/803
See application file for complete search history.

(56) References Cited

U.S. PATENT DOCUMENTS

| | | | |
|---|---|---|---|
| 5,781,773 A * | 7/1998 | Vanderpool et al. | 707/693 |
| 5,913,208 A * | 6/1999 | Brown et al. | 707/706 |
| 5,970,483 A * | 10/1999 | Evans | 707/706 |
| 6,219,668 B1 * | 4/2001 | Arnaud et al. | 709/203 |
| 6,336,117 B1 * | 1/2002 | Massarani | 707/711 |
| 6,366,923 B1 * | 4/2002 | Lenk et al. | 707/706 |
| 6,430,563 B1 * | 8/2002 | Fritz et al. | 707/694 |
| 6,532,461 B2 * | 3/2003 | Evans | 715/200 |
| 6,571,234 B1 * | 5/2003 | Knight et al. | 707/3 |
| 6,694,331 B2 * | 2/2004 | Lee | 707/706 |
| 6,697,821 B2 * | 2/2004 | Ziff et al. | 707/706 |
| 2002/0049727 A1 * | 4/2002 | Rothkopf | 707/1 |
| 2002/0138842 A1 | 9/2002 | Chong et al. | |
| 2009/0049059 A1 * | 2/2009 | Cheah | 707/10 |

FOREIGN PATENT DOCUMENTS

| | | |
|---|---|---|
| EP | 0 992 926 A | 4/2000 |
| JP | 08-149445 | 6/1996 |
| JP | 2002-218436 | 8/2002 |
| JP | 2003-333201 | 11/2003 |
| JP | 2004-23491 A | 1/2004 |
| JP | 2004-56712 | 2/2004 |

* cited by examiner

*Primary Examiner* — Don Wong
*Assistant Examiner* — Kim T Nguyen
(74) *Attorney, Agent, or Firm* — Dickstein Shapiro LLP (57) ABSTRACT

A data control system is disclosed, including a storage unit that stores multiple data items and a presentation unit that presents at least one of the multiple data items upon a request. An identification acquisition unit acquires upon the request identification for identifying one of multiple imaging units. The identification is registered and related to the data item to be presented. An image data acquisition unit acquires image data using the imaging unit the identification of which is acquired by the identification acquisition unit. An image presentation unit presents the at least one of the multiple data items and the image data acquired by the image data acquisition unit.

16 Claims, 15 Drawing Sheets

DATA CONTROL SYSTEM CAPABLE OF PRESENT CURRENT IMAGE OF WRITER WITH DATA

BACKGROUND OF THE INVENTION

1. Field of the Invention

The present invention generally relates to data control, and more particularly, to a data control system that controls data such as documents with a database and presents the controlled data upon a user's request. The present invention further relates to a method of controlling data used in the data control system, a computer program that causes a computer to operate as the data control system, and a program product in which the computer program is stored.

2. Description of the Related Art

Japanese Laid-Open Patent Application No. 2004-56712, for example, discloses a document processing apparatus having push-type copier function, to which a camera for automatically take a picture of an operator of the document processing apparatus. While the operator is operating the document processing apparatus for the creation of a document file, the camera automatically take a picture of the operator thereby to form image data. The image data can be sent to a desired destination with the document file. A receiver of the image data and the document file uses a document control program that indicates the image file as a thumbnail. The receiver can identify the sender before opening the document file.

When displaying a list of documents or a document, a document control system such as an electronic bulletin board, a video conference system, and a workflow system generally indicates not only the title of the document, the text (body) of the document, and the data and time of the document, but also the name or any identification of the writer of the document, for example.

When the receiver would like to contact the sender, the receiver may be able to make a phone call, send an e-mail, originate video conference, or visit the sender. However, the receiver may not know which way is the best to contact the sender.

The conventional document processing apparatus described above allows the receiver to view the image of the sender before opening the document file, which results in preventing the receiver from opening a questionable document file that may be infected with computer virus.

However, in the case of the conventional document processing apparatus described above, the receiver can view the past image of the sender acquired at the time the document file was created, not the current image of the sender. Thus, the receiver cannot know the current status of the sender, and cannot determine which the best way to contact the sender is, that is, making a phone call, sending an e-mail, or originating a video conference.

SUMMARY OF THE INVENTION

Accordingly, it is a general object of the present invention to provide a novel and useful data control system in which at least one of the above problems is eliminated.

Another and more specific object of the present invention is to allow a user (viewer) who has viewed data such as a document registered in a database and wants to contact the writer (or author) of the data, to easily know the current status of the writer (author) and determine which the best way to contact the writer (author) is. Yet another object of the present invention is to allow the user (viewer) to understand the current status of the writer (author) through the viewing process of the data and feel familiar with the writer (author).

To achieve at least one of the above objects, a data control system includes:

a storage unit configured to store a plurality of data items;

a presentation unit configured to present at least one of the plurality of data items upon a request;

an identification acquisition unit configured to acquire upon the request identification for identifying one of a plurality of imaging units, the identification being registered and related to the data item to be presented;

an image data acquisition unit configured to acquire image data using the imaging unit the identification of which is acquired by the identification acquisition unit; and an image presentation unit configured to present the at least one of the plurality of data items and the image data acquired by the image data acquisition unit.

When a request for the viewing of a data item is made, the identification acquisition unit acquires identification for identifying one of the imaging units. The identification is registered and related to the data item that is requested for the presentation. The image data acquisition unit acquires image data using the imaging unit identified by the identification acquired by the identification acquisition unit. The image presentation unit presents the requested data item and the image data acquired by the image data acquisition unit.

Other objects, features, and advantages of the present invention will become more apparent from the following detailed description when read in conjunction with the accompanying drawings.

DETAILED DESCRIPTION OF THE PREFERRED EMBODIMENTS

The preferred embodiments of the present invention are described in detail below.

Figure 1:
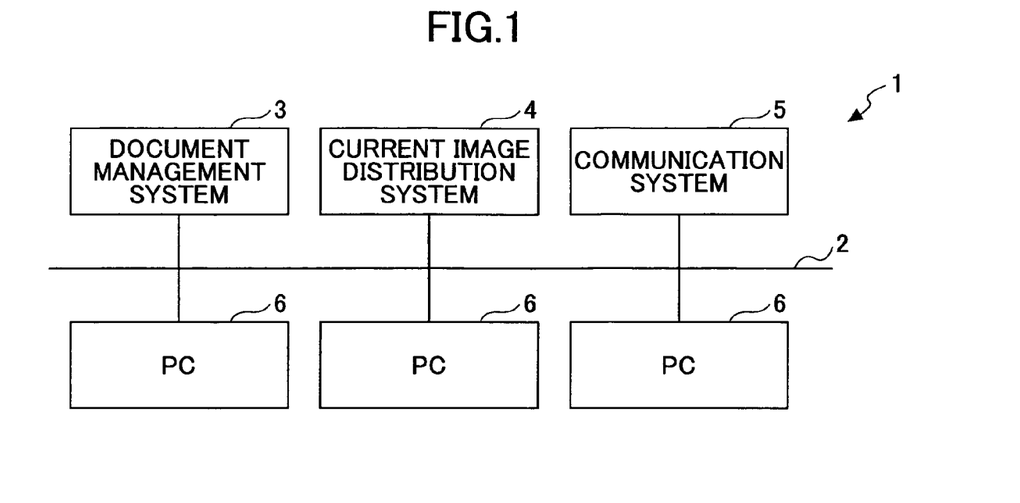
FIG. 1 is a block diagram showing a document viewing system according to an embodiment.

FIG. 1 is a block diagram showing the configuration of a document viewing system 1 according to an embodiment. The document viewing system 1 includes a network such as a local area network that is operated by an organization such as a company and a local government. Server computers that function as a document management system 3, a current image distribution system 4, and a communication system are connected to the network 2. The server computers operate as a data control system according to an embodiment. Multiple personal computers (PC) 6 are connected to the network 2 as client computers.

Figure 2:
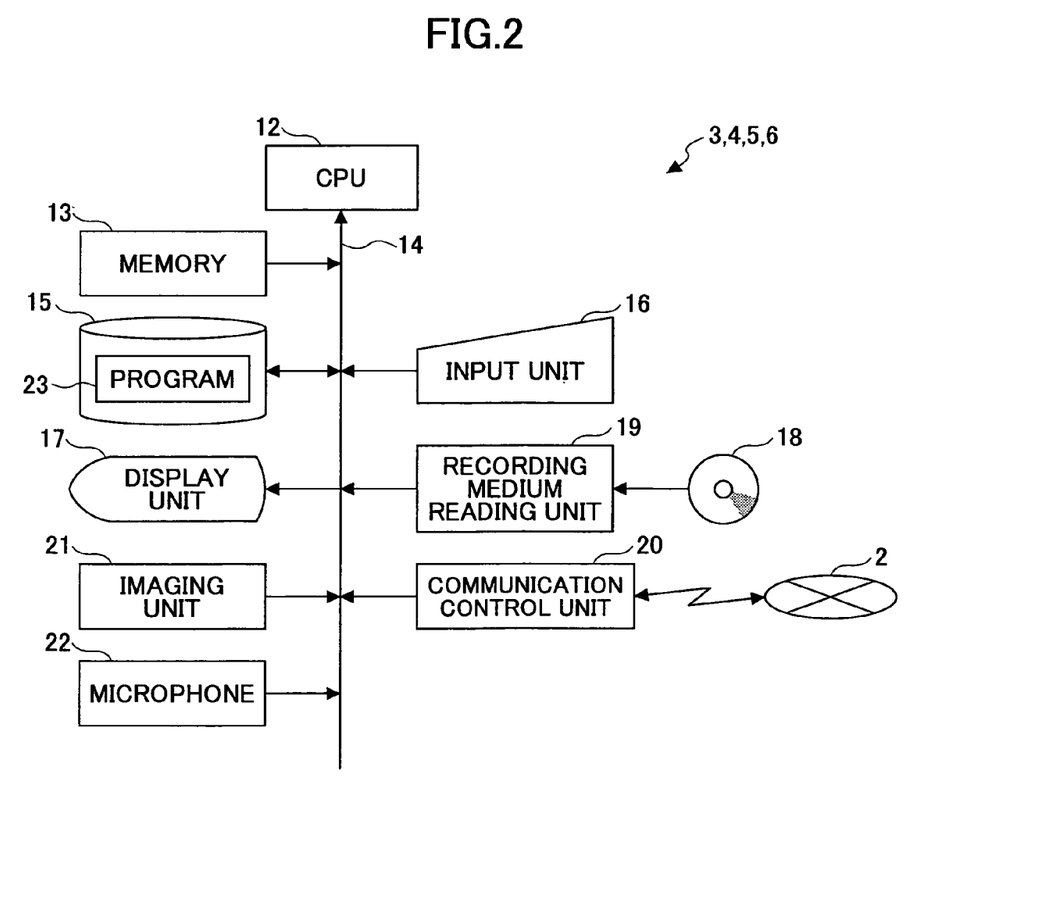
FIG. 2 is a block diagram showing a computer included in the document viewing system, according to an embodiment.

FIG. 2 is a block diagram showing the hardware structure of the server computer 3, 4, or 5, and the client computer 6 included in the document viewing system 1. As shown in FIG. 2, these computers include CPU 12 that centrally control other components and memory 13 including various ROM and RAM connected to a bus 14.

The following components are further connected to the bus 14 via interface: a magnetic storage unit 15 such as a hard disk drive, an input unit 16 such as a keyboard and a mouse, a display unit 17, a recording medium reading unit 19 that reads programs and data stored in a recording medium 18 such as an optical disk, and a communication control unit 20 that interfaces communication with the network 2.

The client computer PC 6 has an imaging unit 21 that acquires moving or still image connected to the bus 14. This imaging unit 21 is installed such that it can acquire the image (at least a waist shot) of a user (writer) operating the PC 6 from the display unit side. In the case in which the communication system 5 supports video conference between the client computers PC 6, the client computer PC 6 includes a microphone 22 connected to the bus 14. This microphone 22 is used to collect the voice of the user (writer) of the client computer PC 6.

An example of the recording medium 18 may include an optical disk such as a CD and a DVD, a magneto-optical disk, and a flexible disk. The recording medium reading unit 19 may be an optical disk drive, a magneto-optical disk drive, and a flexible disk drive corresponding to the type of the recording medium 18.

Each of the server computers and the client computers reads a computer program 23 stored in the recording medium 18, and installs the read computer program 23 in the magnetic storage unit 15 for realizing the specific function of each computer. The computer program 23 may be downloaded through a network such as the Internet, and installed in the magnetic storage unit 15. The installed computer program 23 allows each of the server computers and the client computers to perform predetermined steps to be described below. The computer program 23 may be executed on an operating system (OS). The computer program according to an embodiment of the present invention corresponds to the computer program 23 installed in the document management system 3.

The operation of the document viewing system 1 is described below.

Figure 3:
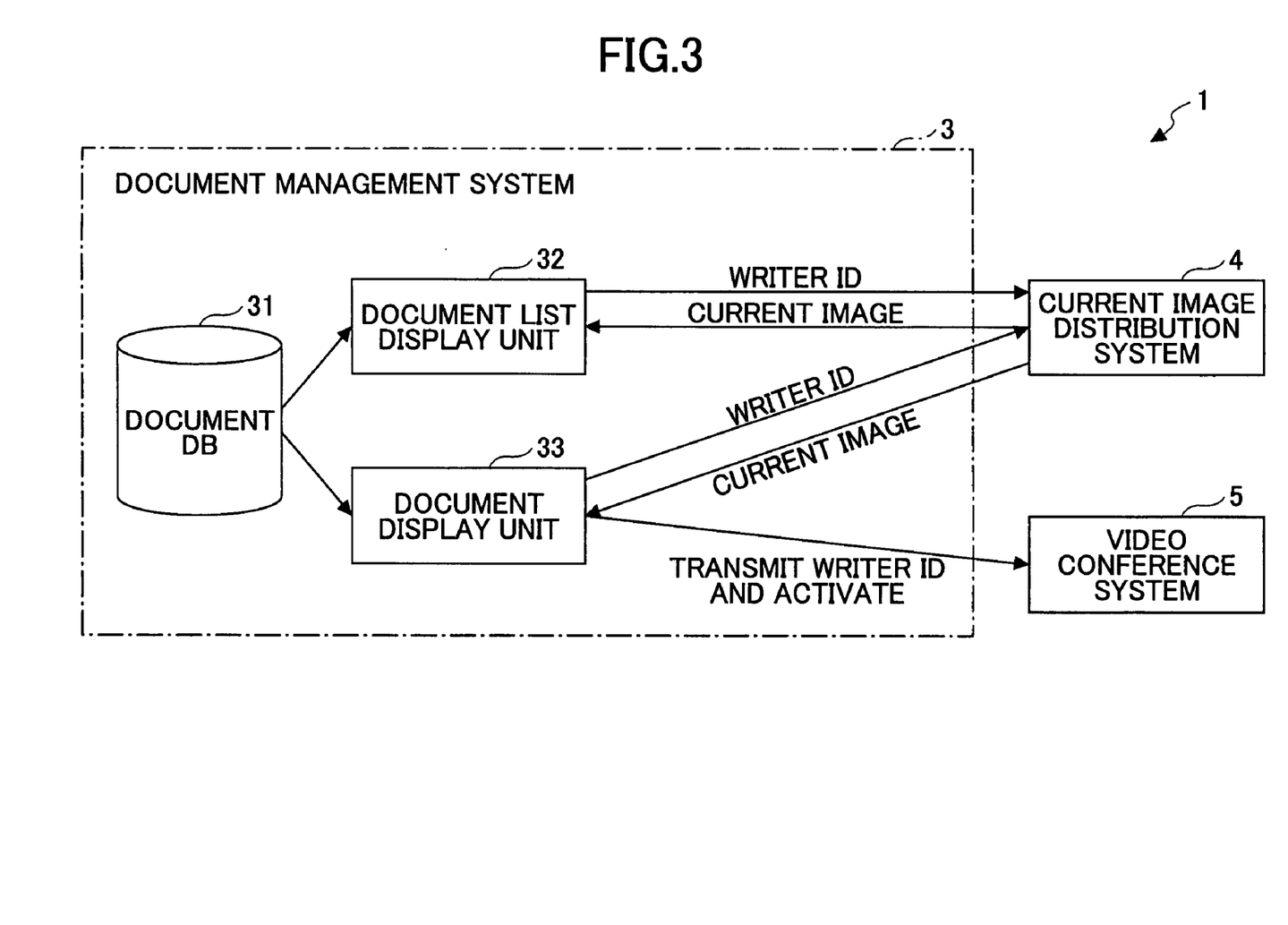
FIG. 3 is a block diagram showing the function of a document viewing system according to an embodiment.

FIG. 3 is a block diagram showing the function of the document viewing system 1 according to an embodiment. The document management system 3 controls a document database (DB) 31 built in the magnetic storage unit 15. A number of data items (document data, in this case) can be registered to the document database 31. In response to a request from a client PC 6, a document list display unit 32 presents the list of documents registered to the document database 31, and a document display unit 33 presents the contents of at least one of the documents registered to the document data base.

An example of the contents of the documents registered to the document database 31 includes the title of the document, the data and time of registration, the writer of the document as well as the text (body) of the documents. The identification information (writer ID) is also registered being related to each document to indicate who the writer of the document is.

The identification of the client PC 6 (device ID) and the writer ID of a user (writer) who uses the client PC 6 are registered to the current image distribution system 4 being related to each other. In response to receipt of a writer ID from the document list display unit 32 and/or the document display unit 33 of the document management system 3, the current image distribution system 4 identifies a device ID registered in connection with the writer ID. The current image distribution system 4 acquires the image data of a still picture or moving picture (current image) captured by the imaging unit 21 of the client PC 6 identified by the device ID, and transmits the image data to the document management system 3. As described above, the writer ID and the device ID can be used as identification of the imaging unit 21 provided to each client PC 6.

When presenting the contents of a document registered to the document database 31, the document display unit 33 acquires the writer ID of the document to be presented, and transmits the writer ID to the current image distribution system 4. The image distribution system 4 acquires the image data of the current image from the client PC 6 corresponding to the writer ID, and transmits the acquired image data to the document display unit 33. The document display unit 33 presents the current image with the contents of the registered document.

Figure 4:
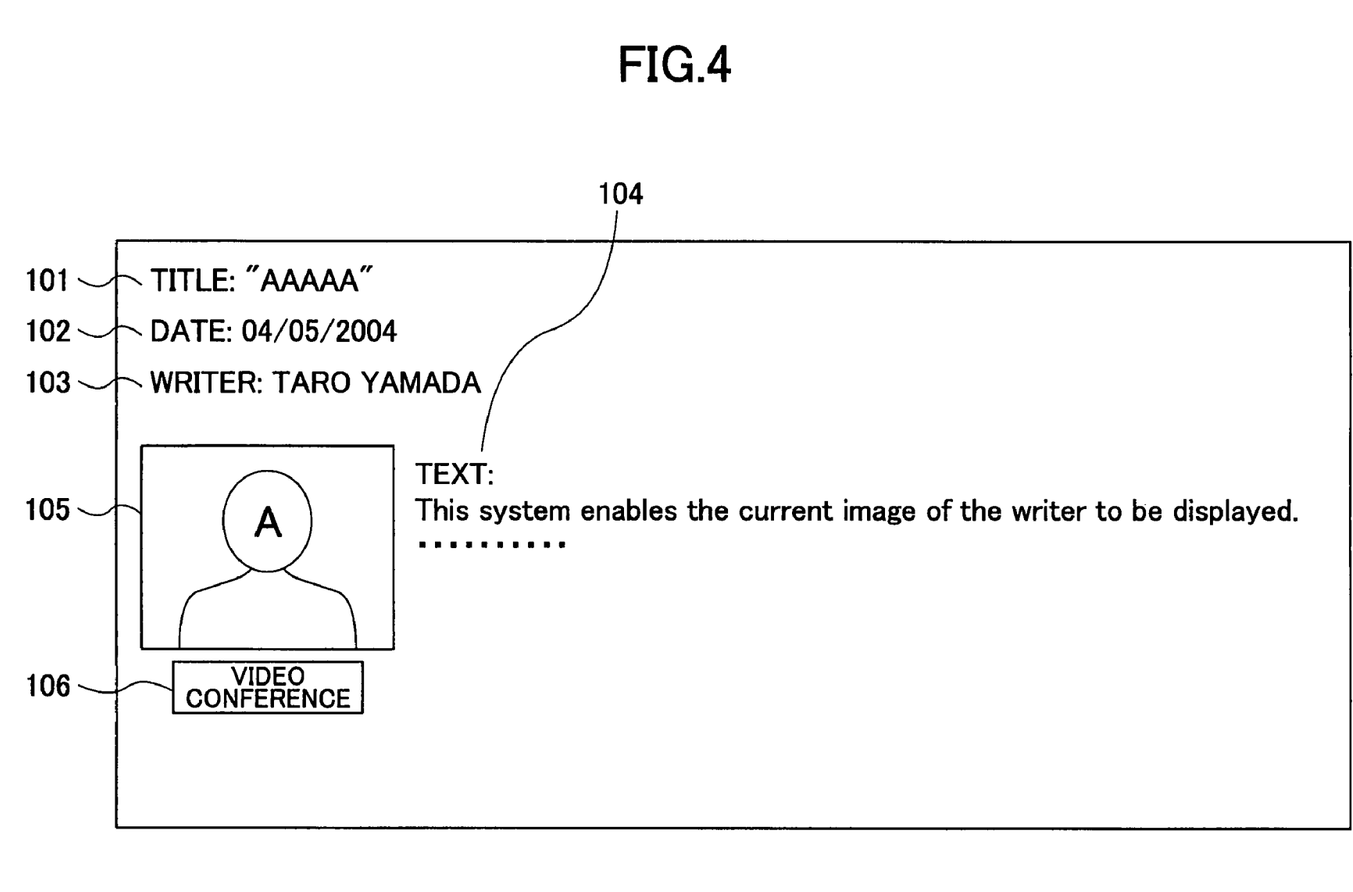
FIG. 4 illustrates an example of screen according to an embodiment.

FIG. 4 illustrates an exemplary screen of the display unit 17 of the client PC 6. The screen shown in FIG. 4 includes the current image 105 as well as the title 101 of the document, the date 102 of the document, the writer 103 of the document, and the text (body) 104 of the document.

When the document list display unit 32 presents the list of documents registered to the document database 31 to a requesting client PC 6, the document list display unit 32 obtains the writer ID's of the documents to be listed, and transmits the writer ID's to the current image distribution system 4. The image distribution system 4 acquires the image data of the current image from each client PC 6, the device ID of which has been received, and transmits the acquired image data to the document list display unit 32. The document list display unit 32 presents the current image with the contents of each registered document included in the list.

Figure 5:
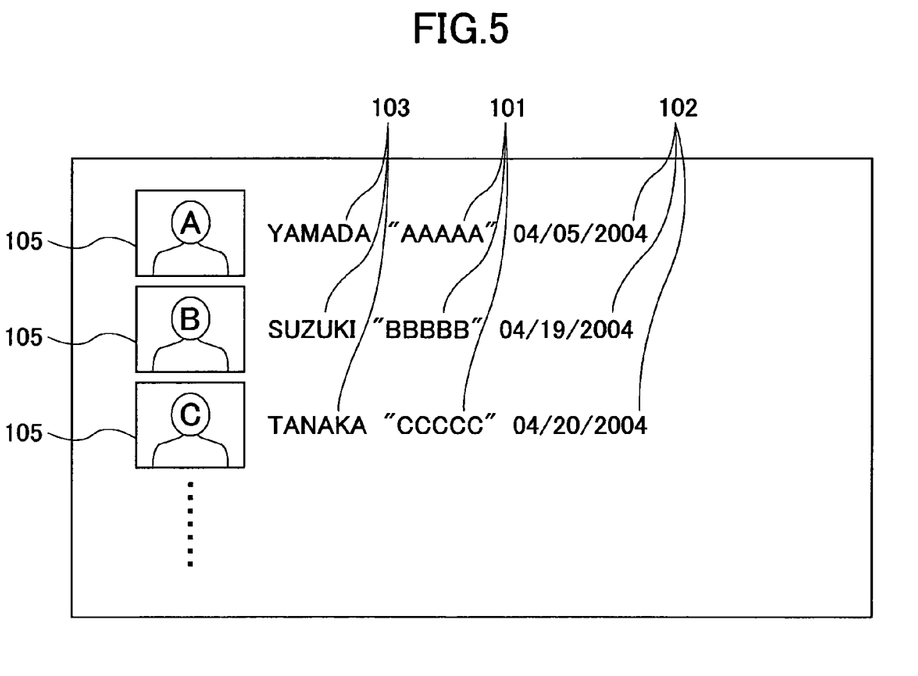
FIG. 5 illustrates another example of screen according to an embodiment.

FIG. 5 illustrates an exemplary screen displayed by the display unit 17 of the client PC 6 in this case. The screen shown in FIG. 5 includes the current image 105 of each registered document as well as the title 101, date 102 of registration, writer 103 of each document.

As described above, the document viewing system 1 allows the user (viewer) to view the current image 105 of the writer of the registered document or the list of registered documents when presenting the registered document or the list of registered documents. Therefore, if the user (viewer) wants to contact the writer, the user can determine how to appropriately contact the writer by checking the current image. For example, if the current image 105 shows that the writer is present at his/her desk, the user can select real time communication with the writer by telephone or video conference, for example. The user may visit the writer. If the current image 105 shows that the writer is not present at his/her desk, the user can send an e-mail message to the writer, for example. Alternatively, the user may wait for a while and check again the current image to determine that the writer has come back to his/her desk, and use telephone and/or video conference.

The user may contact the writer of the document through the communication system 5 after checking the current image of the writer of the document with the current image 105. The communication system 5 may be embodied as a video conference system, an e-mail system, and a chat system, for example. The user can contact the writer through video conference, e-mail, and/or chat.

Figure 6:
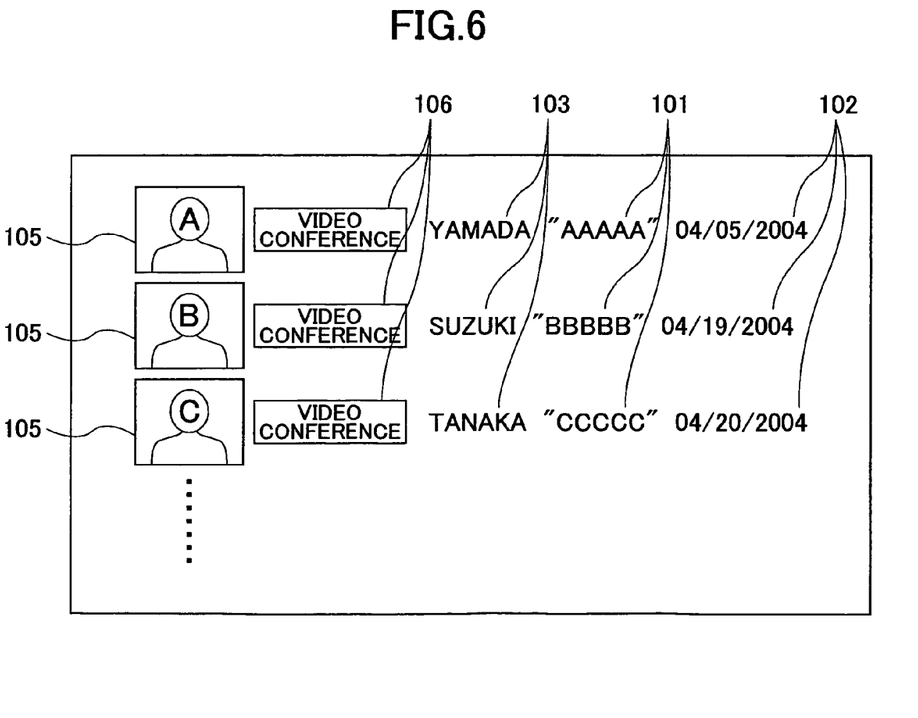
FIG. 6 illustrates an example of screen in the case in which video conference function is available, according to an embodiment.

In the case shown in FIG. 3, since the communication system 5 is a video conference system, the clients PC6 can communicate by video conference via the communication system 5. In this case, when the user clicks a button "video conference" 106 in the screen shown in FIG. 4 (see FIG. 6 for the case in which the list of registered documents is presented), the document display unit 33 transmits the writer ID of the registered document to the communication system (video conference system) 5. The writer ID is registered to the video conference system 5 being related to the device ID of the client PC 6. The communication system 5 establishes video conference between the client PC 6 having the device ID corresponding to the received writer ID and the client PC 6 of the user who has viewed the registered document.

Figure 7:
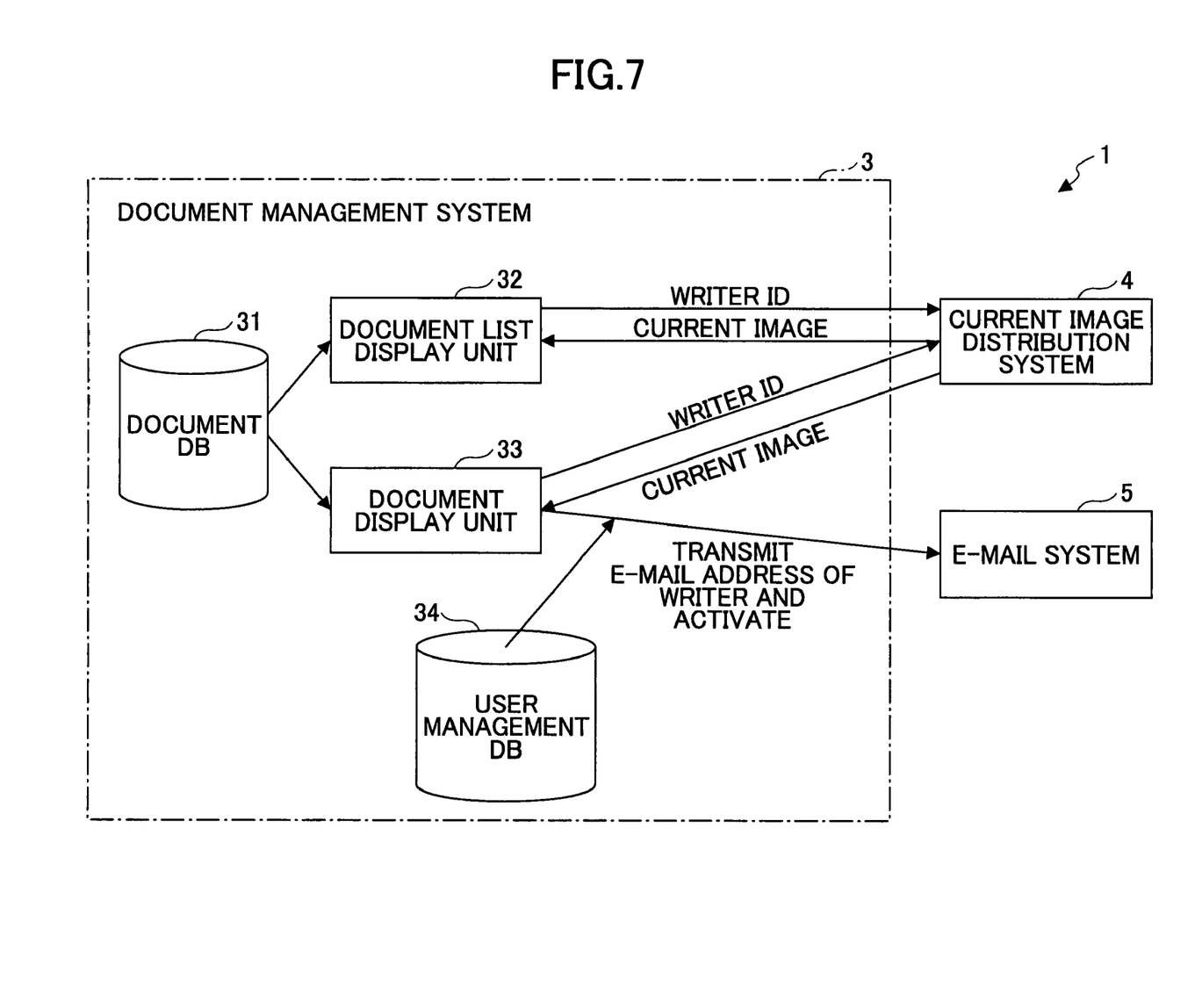
FIG. 7 is a block diagram showing the function of a document viewing system in the case in which e-mail function is available, according to an embodiment.
Figure 8:
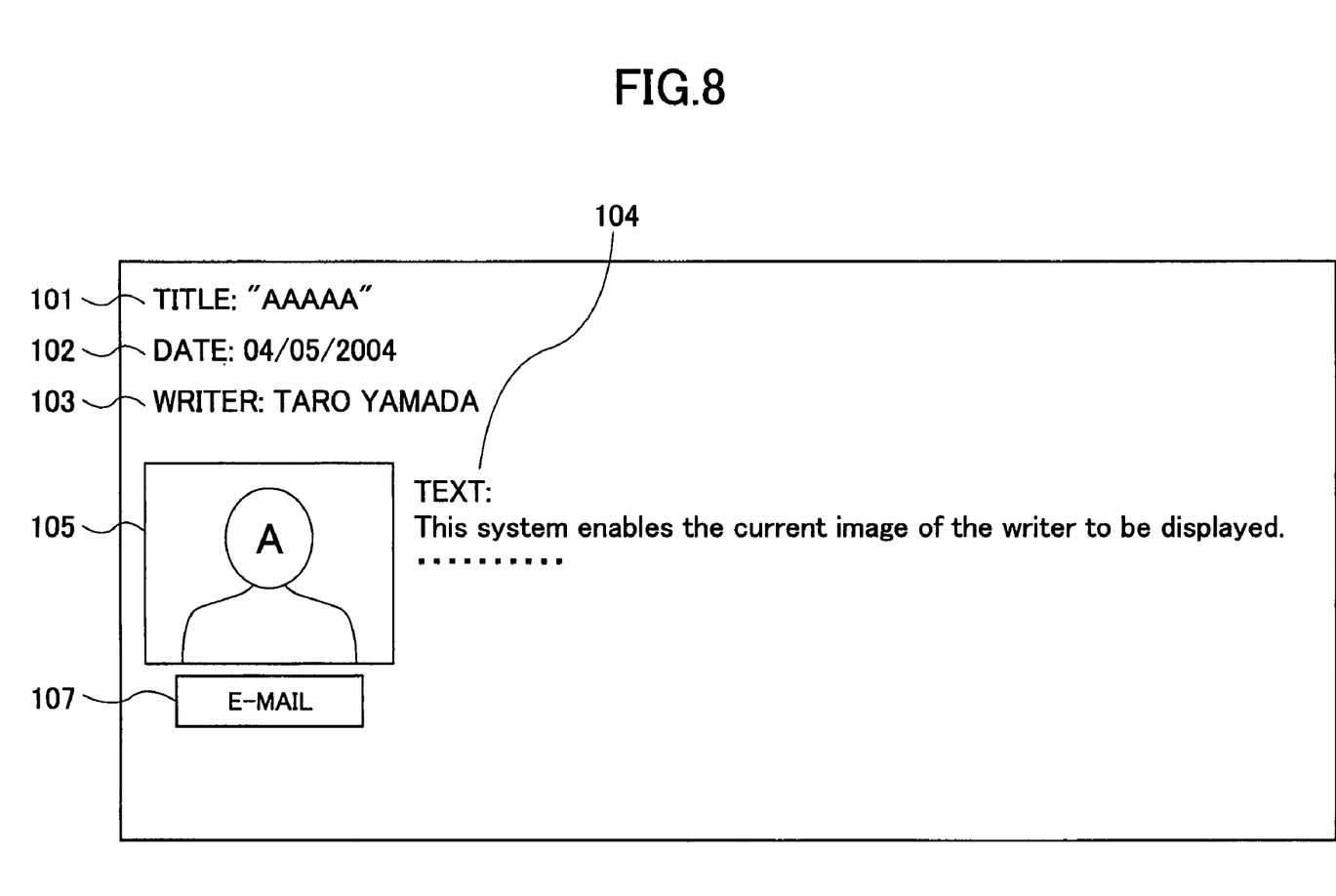
FIG. 8 illustrates an example of screen in the case in which e-mail function is available, according to an embodiment.
Figure 9:
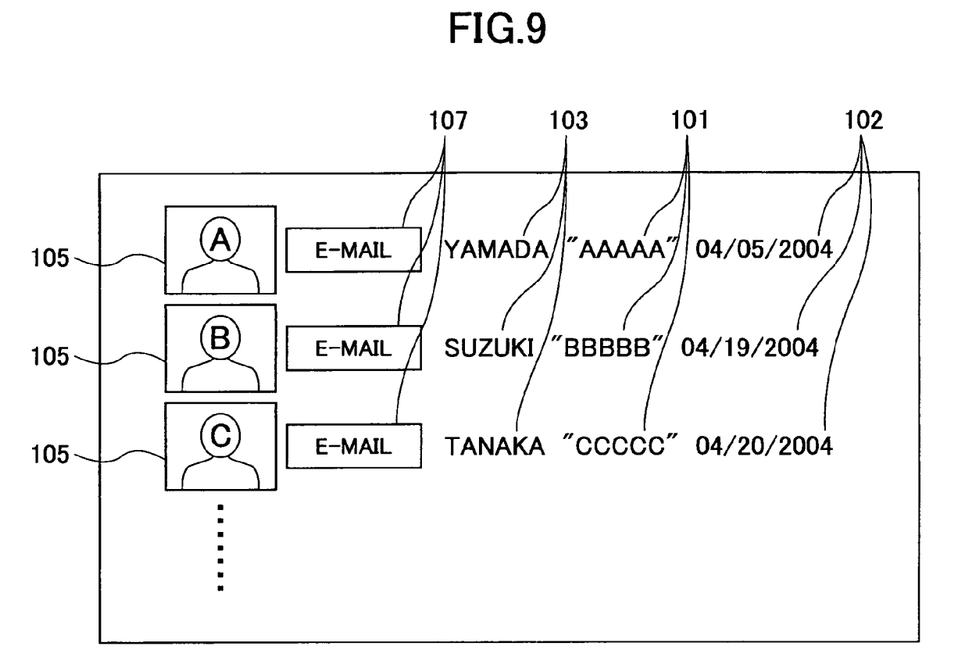
FIG. 9 illustrates another example of screen in the case in which e-mail function is available, according to an embodiment.

FIG. 7 is a block diagram showing the document viewing system 1 in the case in which the communication system 5 is an e-mail system. As shown in FIG. 7, the document management system 3 includes a user management database (DB) 34. The e-mail address of each user and the writer ID of the user are registered and related to each other. When the viewer of the registered document clicks a button "e-mail" 107 (see FIGS. 8 and 9), an e-mail creation screen (not shown) is opened on the client PC 6. The viewer of the registered document can write an e-mail message to the writer of the registered document using the e-mail creation screen. In response to receipt of the writer ID of the registered document, the document display unit 33 retrieves the e-mail address related to the writer ID. The e-mail message is sent to the retrieved e-mail address.

Figure 10:
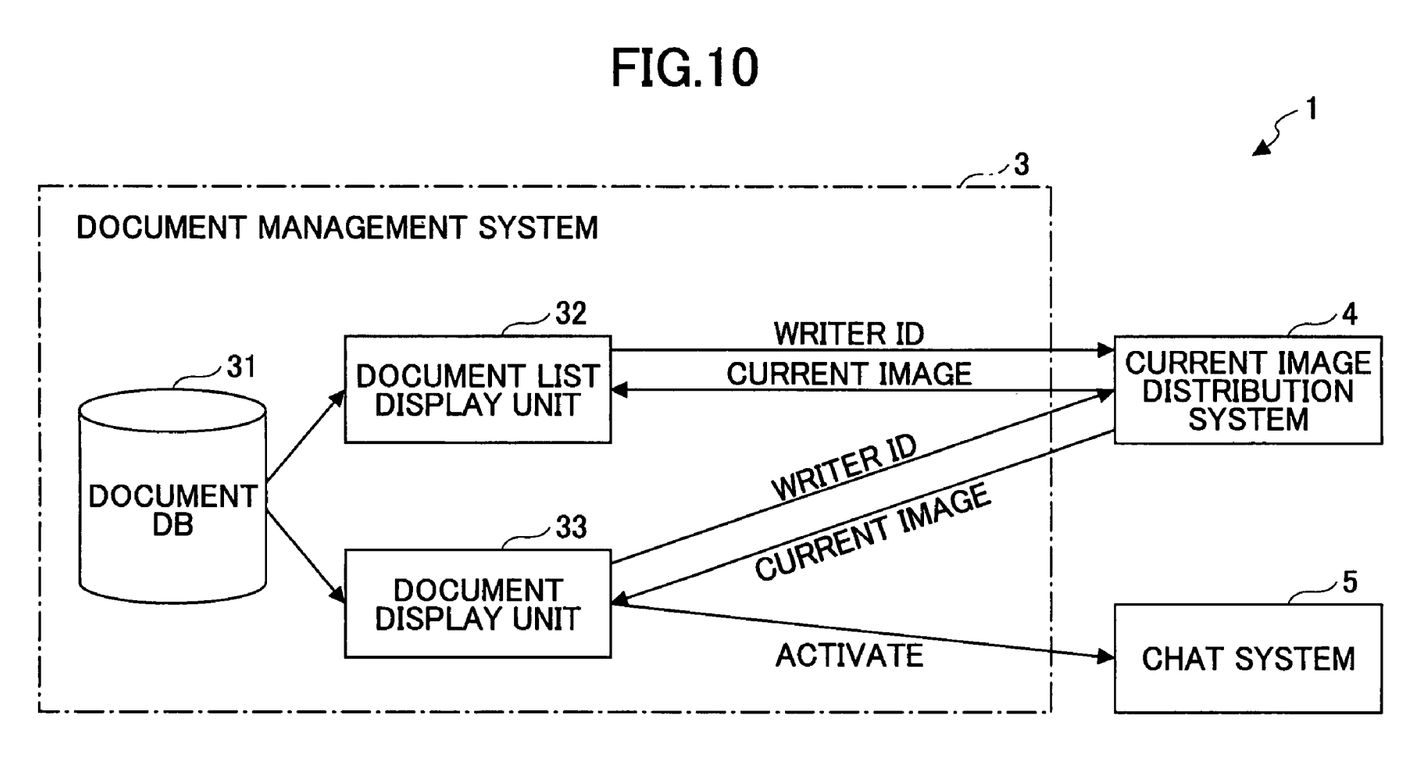
FIG. 10 is a block diagram showing the function of a document viewing system in the case in which chat function is available, according to an embodiment.
Figure 11:
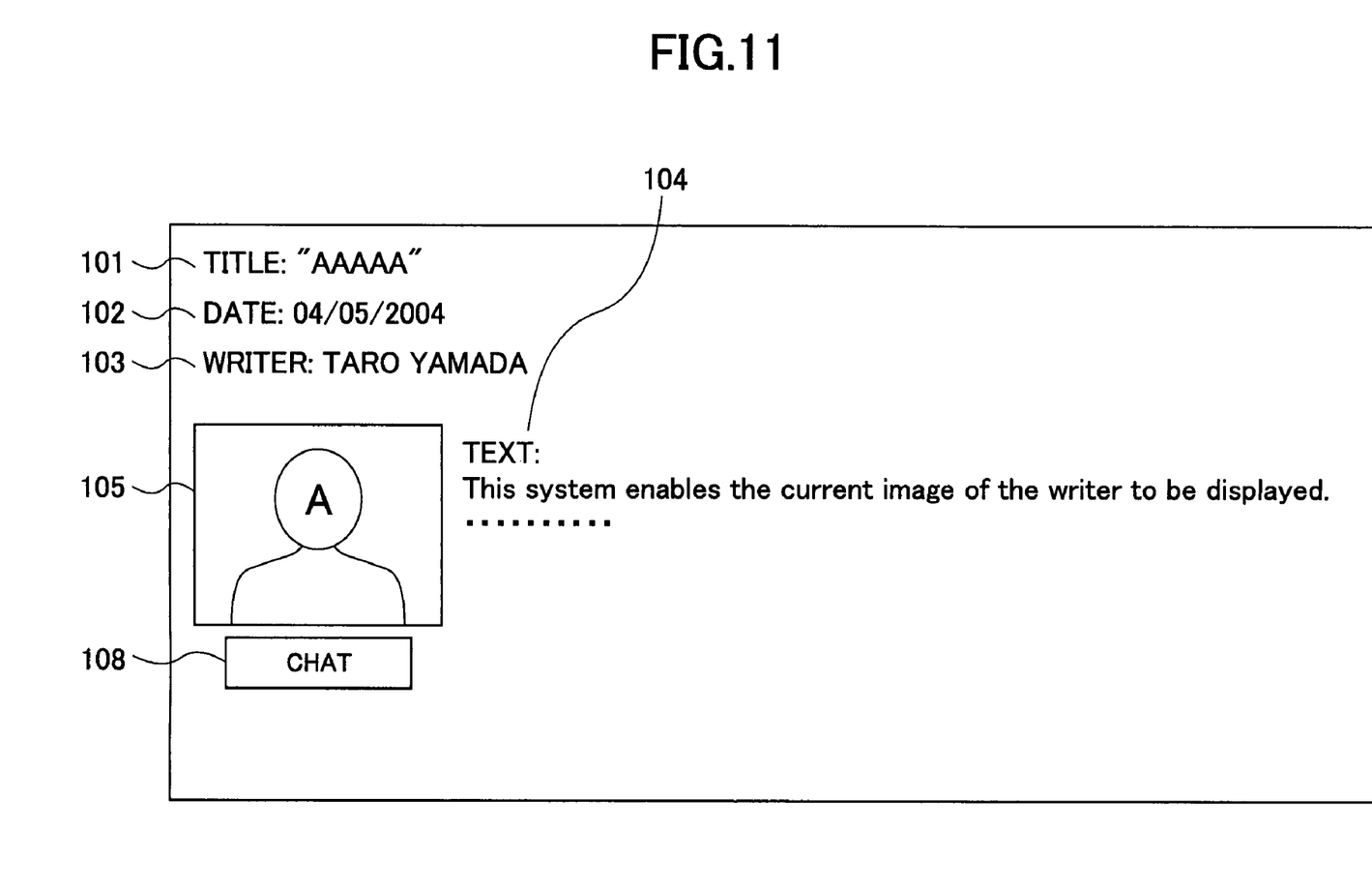
FIG. 11 illustrates an example of screen in the case in which chat function is available, according to an embodiment.
Figure 12:
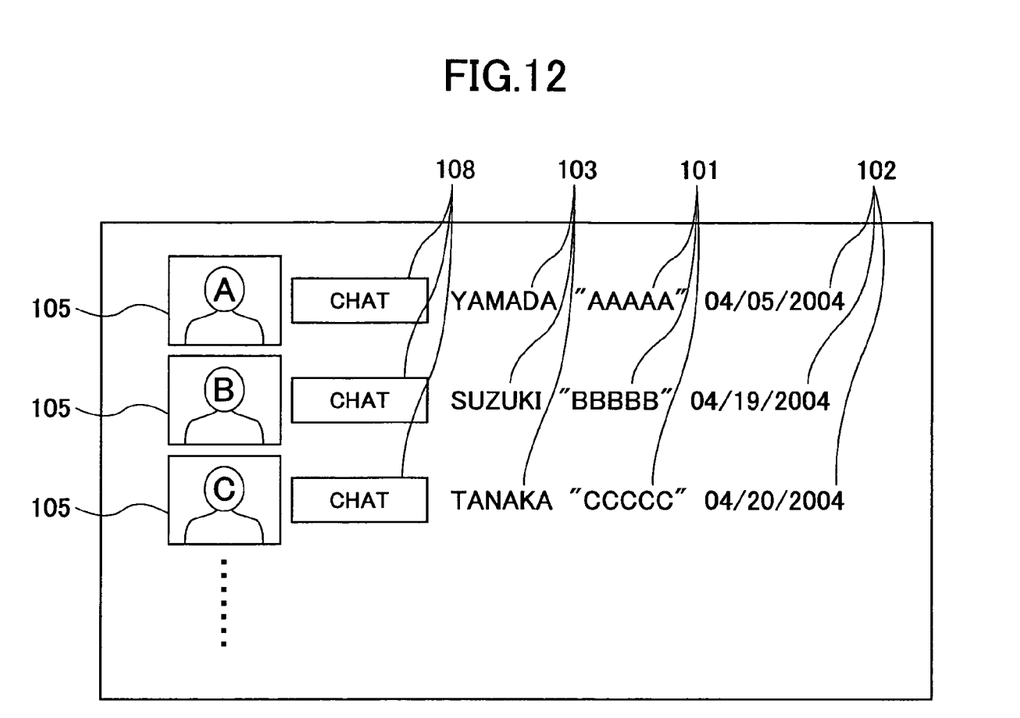
FIG. 12 illustrates another example of screen in the case in which chat function is available, according to an embodiment.

FIG. 10 is a block diagram showing the document viewing system 1 in the case in which the communication system 5 is the chat system. When the viewer of the registered document clicks a button "chat" 108 in the screen displayed on the client PC 6 (see FIGS. 11 and 12), the document display unit 33 activates the chat system 5. The viewer of the registered document can contact the writer of the registered document through chat (or instant message).

Figure 13:
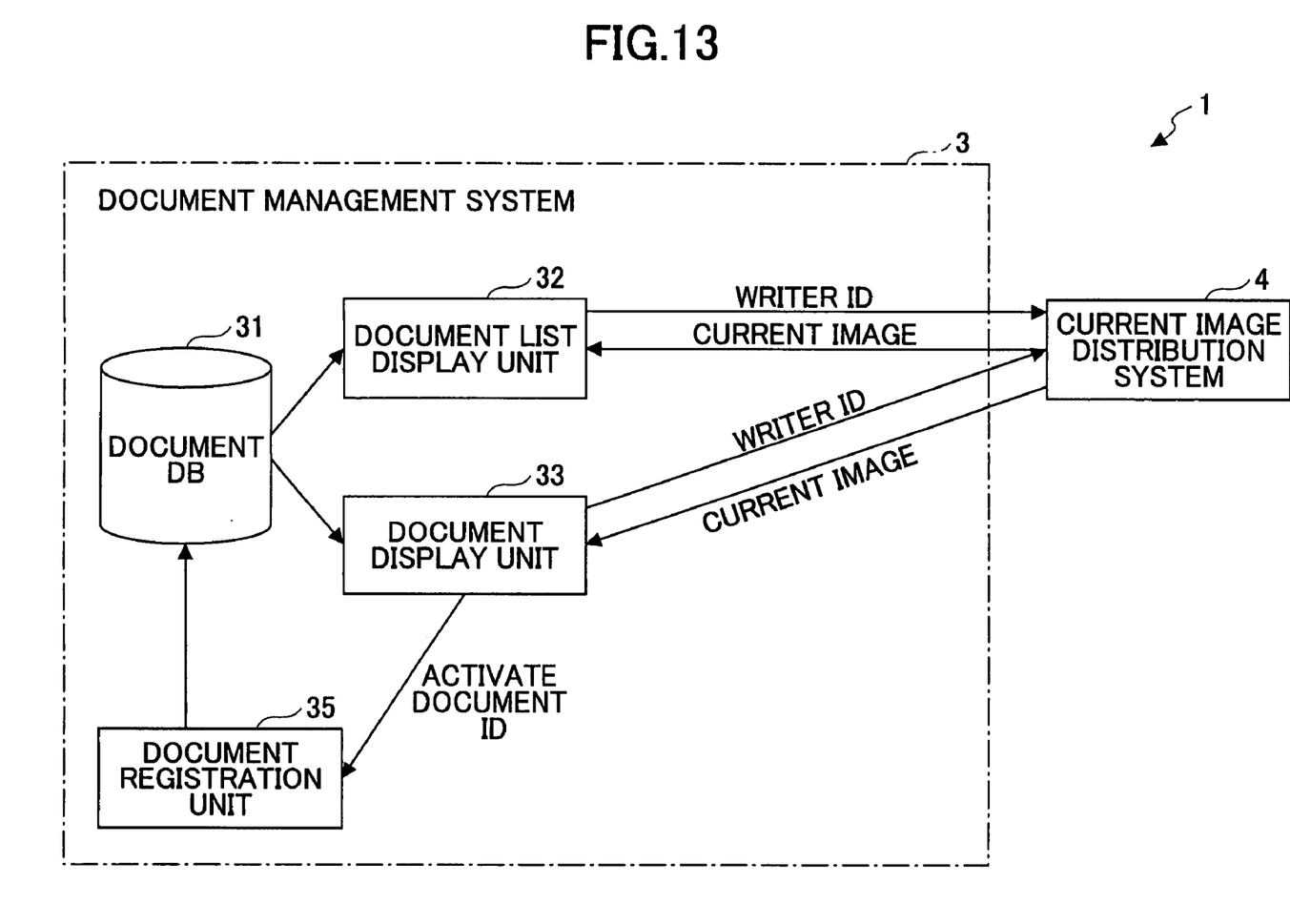
FIG. 13 is a block diagram showing the function of a document viewing system in the case in which a return document can be registered, according to an embodiment.
Figure 14:
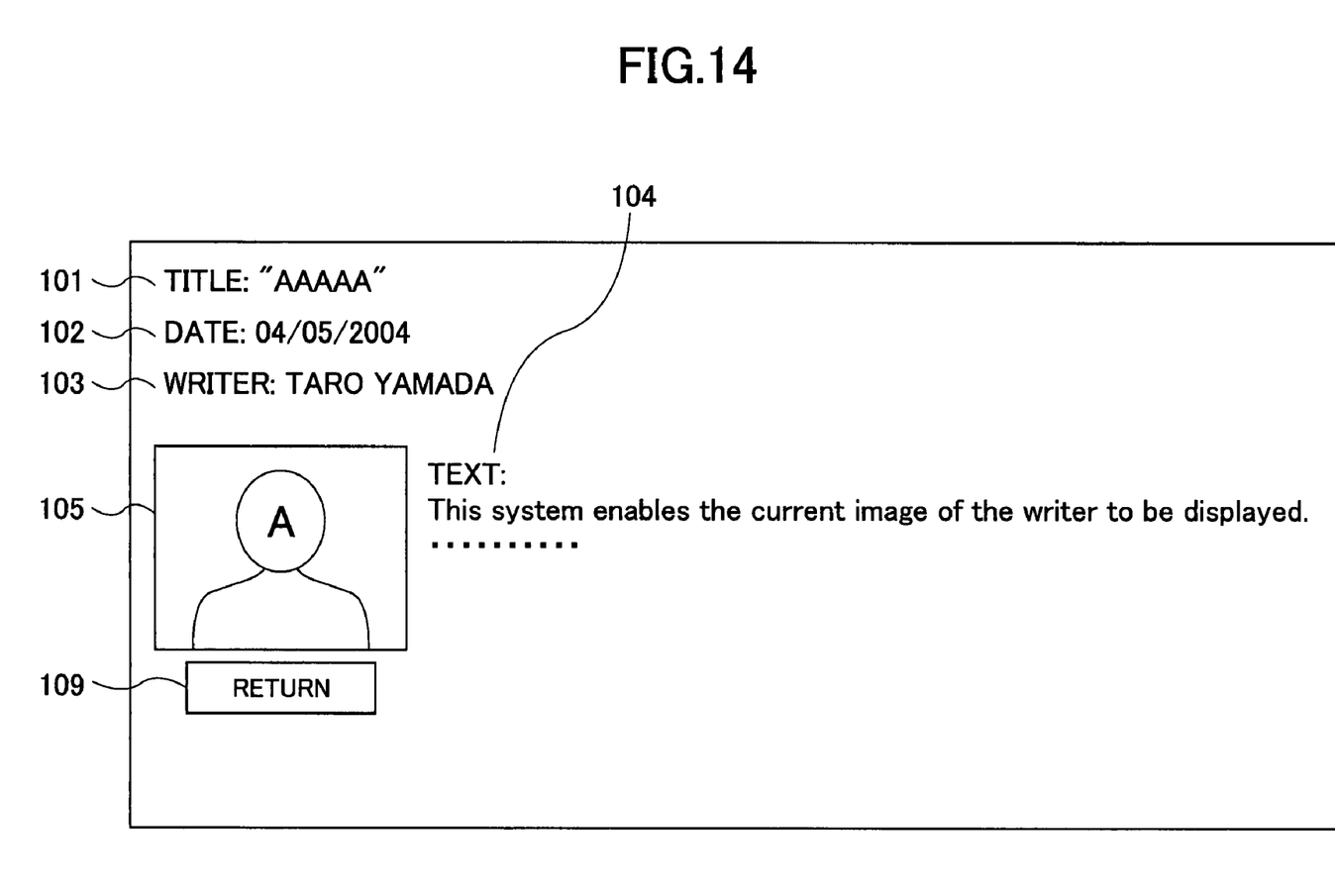
FIG. 14 illustrates an example of screen in the case in which a return document can be registered, according to an embodiment.
Figure 15:
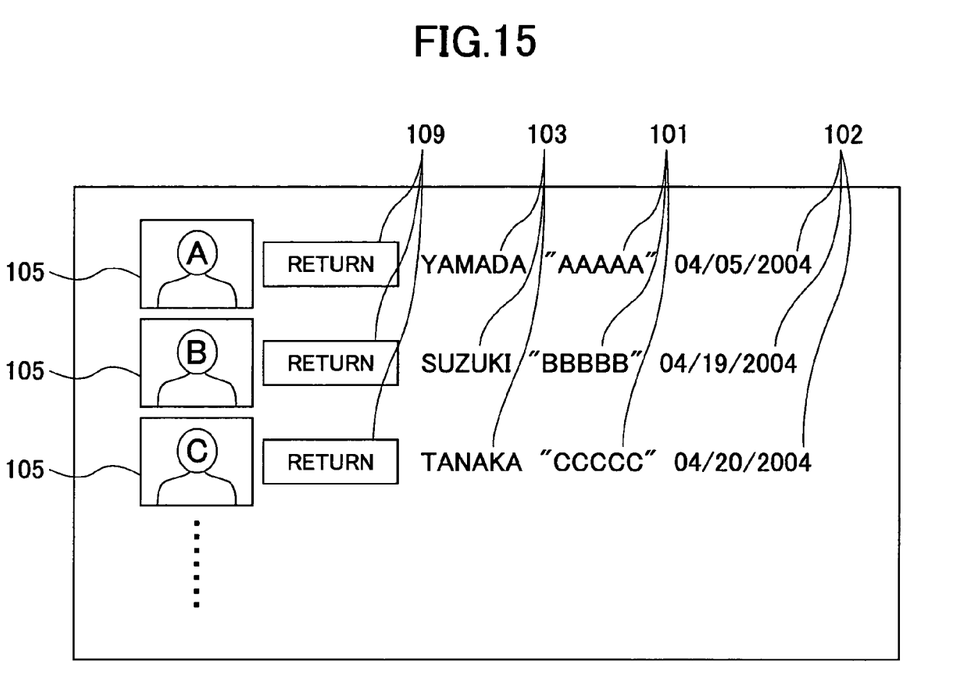
FIG. 15 illustrates another example of screen in the case in which a return document can be registered, according to an embodiment.

As shown in a block diagram of FIG. 13, the document management system 3 may not include the communication system 5, but include a document registration unit 35 that allows the viewer of the registered document to create a return document as a response to the registered document. The viewer can create the return document by clicking a button "return" 109 shown in the screen of the client PC 6. The document registration unit 35 acquires the document ID of the registered document viewed by the viewer from the document display unit 33. The document registration unit 35 registers the return document to the document database 31, the return document being related to the registered document viewed by the viewer. Specifically, the registered document and the return document to the registered document may be viewed using the client PC 6 in the similar manner as a document management system known as an electronic bulletin board.

Figure 16:
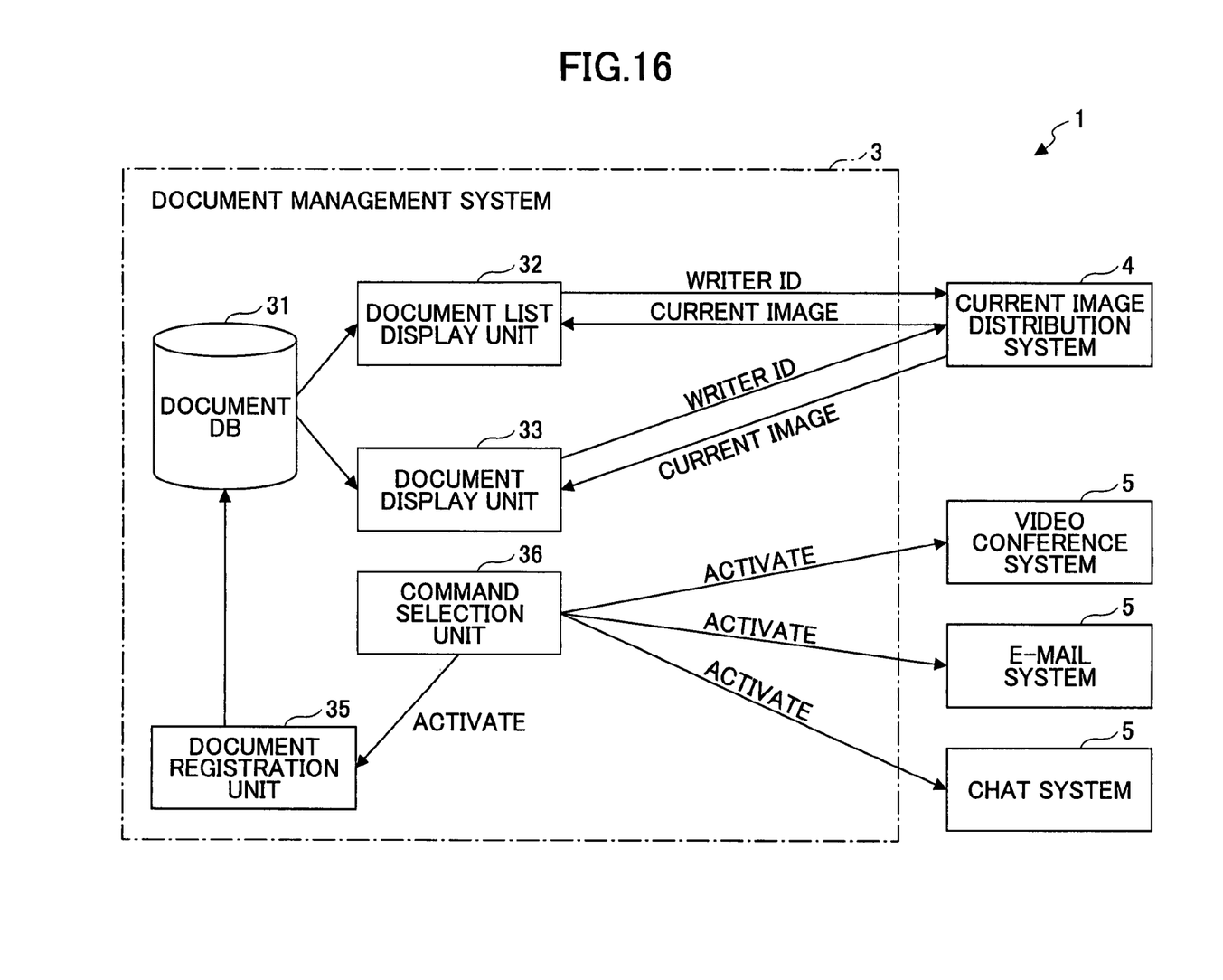
FIG. 16 is a block diagram showing the function of a document viewing system in the case in which video conference function, e-mail function, and chat function are available and a return document can be registered, according to an embodiment.
Figure 17:
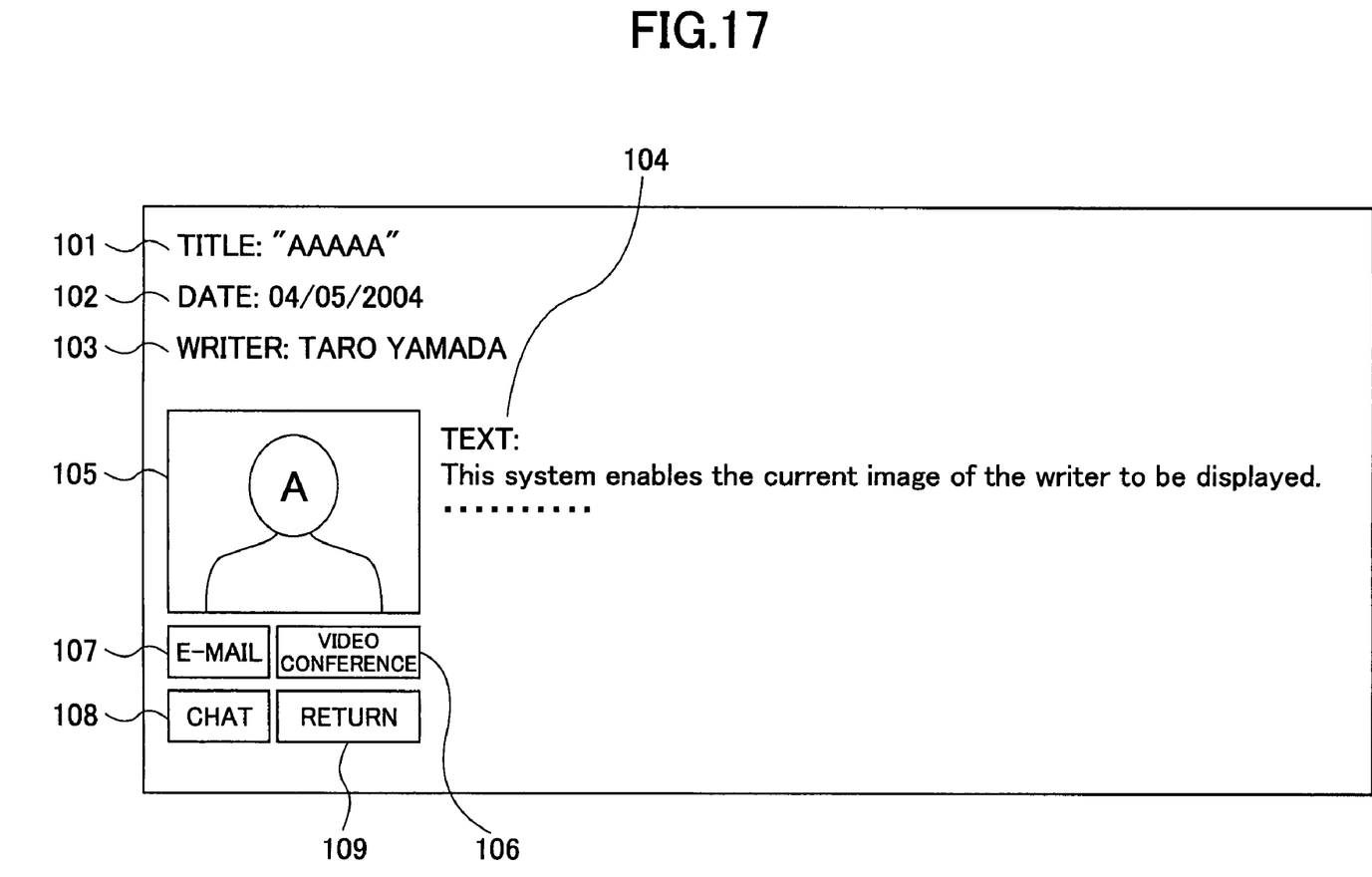
FIG. 17 illustrates an example of screen in the case in which video conference function, e-mail function, and chat function are available and a return document can be registered, according to an embodiment.

As shown in the block diagram of FIG. 16, multiple types of communication system 5 and the document registration unit 35 may be provided at the same time. That is, the viewer of the registered document may contact the writer of the registered document through video conference, e-mail, and/or chat using the multiple communication systems 5 that are the video conference system, the e-mail system, and/or the chat system described above. The viewer of the registered document can register the return document to the document database 31 as described above. In this case, all buttons 106-109 are displayed on the screen of the client PC 6 as shown in FIG. 17. A command selection unit 36 provided in the document management system 3 selectively activates one of the multiple communication systems 5 and the document registration unit 35 in dependence on the button 106-109 selected by the viewer of the registered document.

In summary, if an imaging unit is provided to the client PC of each user of the document viewing system according to an embodiment, and enables image data of each user to be acquired, the document viewing system allows a user (viewer) who views a document written by another user (writer) to easily determine which (telephone, video conference, e-mail, or visiting, for example) the most appropriate way to contact the writer is by checking the image data of the writer acquired by the imaging unit.

The document viewing system allows the viewer to understand the current status of the writer through the viewing process of the data and feel familiar with the writer.

The preferred embodiments of the present invention are described above. The present invention is not limited to these embodiments, but variations and modifications may be made without departing from the scope of the present invention.

This patent application is based on Japanese priority patent application No. 2004-146574 filed on May 17, 2004, the entire contents of which are hereby incorporated by reference.

What is claimed is:

1. A data control system connected with a plurality of clients via a network, the data control system comprising:
   a processor;
   a storage unit configured to store a plurality of data items;
   a plurality of communication systems each configured to allow a particular client to communicate with another client using a different communication method;
   an identification acquisition unit configured to acquire identification for identifying one of a plurality of imaging units provided to the plurality of clients, the identification being registered in the storage unit and related to the data item to be presented, and the imaging unit being configured to capture a still picture or a moving picture of at least one person who has produced the data item to be presented;

an image data acquisition unit configured to acquire image data that is the still picture or the moving picture captured using the imaging unit corresponding to the identification acquired by the identification acquisition unit;

a presentation unit configured to present, in response to a request from the client, one of the plurality of data items to the client; and a selection unit configured to allow a user of the particular client to select one of the communication systems, wherein the presentation unit is further configured to present the image data acquired by the image data acquisition unit for the user's selection of the communication systems.

2. The data control system as claimed in claim 1, wherein the data item is document data.

3. The data control system as claimed in claim 1, further comprising a communication unit configured to enable users of the data control system to communicate through a network.

4. The data control system as claimed in claim 3, the communication unit enables communication through video conference.

5. The data control system as claimed in claim 3, the communication unit enables communication through e-mail.

6. The data control system as claimed in claim 3, the communication unit enables communication through chat.

7. The data control system as claimed in claim 3, the communication unit is further configured to register a return document as a response to the data item presented by the presentation unit.

8. The data control system as claimed in claim 3, further comprising at least one more communication unit configured to enable users of the data control system to communicate through the network.

9. In a data control system connected with a plurality of clients via a network and having a plurality of communication systems each configured to allow a particular client to communicate with another client using a different communication method, a method of controlling data, the method comprising the steps of:

acquiring identification for identifying one of a plurality of imaging units provided to the plurality of clients, the identification being registered in the storage unit and related to a data item to be presented, and the imaging unit being configured to capture a still picture or a moving picture of at least one person who has produced the data item to be presented;

acquiring image data captured using the imaging unit corresponding to the acquired identification;

presenting the acquired image data that is the still picture or the moving picture captured for the selection of the communication systems;

selecting one of the communication systems in response to a user operation; and presenting, in response to a request from the client, the data item to the client.

10. The method as claimed in claim 9, wherein the data item is document data.

11. The method as claimed in claim 9, further comprising the step of enabling users of the data control system to communicate through a network.

12. A computer-readable storage medium storing a computer program that causes a computer to register a plurality of data items and present at least one of the plurality of data items upon a request, the computer program comprising the steps of:

acquiring identification for identifying an imaging unit provided to one of a plurality of clients, the identification being registered in a storage unit and related to a data item to be presented, and the imaging unit being configured to capture a still picture or a moving picture of at least one person who has produced the data item to be presented;

acquiring image data that is the still picture or the moving picture captured using the imaging unit corresponding to the acquired identification;

presenting the acquired image data for the selection of a plurality of communication systems each configured to allow a particular client to communicate with another client using a different communication method;

selecting one of the communication systems in response to a user operation; and presenting, in response to a request from the client, the data item to the client.

13. The data control system as claimed in claim 1, wherein the imaging unit is an image capture unit and the image data is captured with the image capture unit.

14. The data control system as claimed in claim 1, wherein the imaging unit is configured to capture the image data at the time of the request.

15. The method as claimed in claim 9, further comprising capturing the image data at the time of the request.

16. The computer-readable storage medium as claimed in claim 12, wherein the imaging unit is configured to capture the image data at the time of the request.

\* \* \* \* \*